(12) United States Patent
Alland et al.

(10) Patent No.: US 6,404,328 B1
(45) Date of Patent: Jun. 11, 2002

(54) DISCRIMINATION OF DETECTED OBJECTS IN A VEHICLE PATH

(75) Inventors: Stephen William Alland, Tucson, AZ (US); James Fredrick Searcy, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/696,748

(22) Filed: Oct. 24, 2000

(51) Int. Cl.$^7$ .................................................. B60Q 1/00
(52) U.S. Cl. ...................... 340/435; 340/903; 701/220; 701/301; 701/342; 701/70; 701/455
(58) Field of Search ................................. 340/435, 903, 340/436; 701/200, 94, 70, 301; 342/70, 71, 455

(56) References Cited

U.S. PATENT DOCUMENTS 4,308,536 A * 12/1981 Sims, Jr. et al. ......... 343/7 VM
5,285,207 A * 2/1994 Asbury et al. .............. 342/129

* cited by examiner

*Primary Examiner*—Julie Lieu
(74) *Attorney, Agent, or Firm*—Robert M. Sigler

(57) ABSTRACT

An object sensing system is capable of distinguishing an overhead roadway object, that is not in a host vehicle path, from a substantially motionless roadway object that is in the vehicle path. Initially, a plurality of sensor scan signals are provided into an anticipated path of a host vehicle. Next, a plurality of object return signals that correspond to reflections of the plurality of sensor scan signals from at least one detected stationary object are received. Then, an average amplitude slope of the return signals as a function of the range to the at least one detected stationary object is determined. A sufficiently positive amplitude slope identifies the detected stationary object as an overhead roadway object that is not in the vehicle path. A sufficiently negative amplitude slope identifies the detected stationary object as a substantially motionless roadway object that is in the vehicle path.

24 Claims, 4 Drawing Sheets

DISCRIMINATION OF DETECTED OBJECTS IN A VEHICLE PATH

Technical Field

The present invention is generally directed to detecting objects, and more specifically to discerning whether a detected object is in a vehicle path.

BACKGROUND OF THE INVENTION

Increasingly, vehicle manufactures are installing safety devices in vehicles to enable drivers to drive in a safer, more efficient manner. For example, some manufactures have included forward looking systems (FLSs), rear detection systems (RDSs) and side detection systems (SDSs) within certain vehicle models. An adaptive cruise control (ACC) system is one example of a FLS.

A typical ACC system uses a sensor (e.g., a radar or laser sensor), mounted at the front of a host vehicle, to detect objects in the forward path of the vehicle. When an object is detected, the ACC system typically compares the projected path of the vehicle to the object location such that objects on the roadside or in different lanes are eliminated. That is, if the lane ahead is clear, the ACC system maintains a set vehicle speed. However, when a slower vehicle is detected that is in the vehicle path, the ACC system maintains a driver selected distance (using throttle control and limited braking) between the vehicles. A typical ACC system uses a mechanically scanned radar sensor, which normally improves the ability of the system to detect targets (e.g., other vehicles) in heavy traffic. A typical commercially available ACC system has a range of one-hundred fifty meters, an azimuth coverage of fifteen degrees and updates approximately ten times per second. ACC systems generally determine the range of a detected object, as well as the relative speed of the detected object.

However, commercially available FLSs have been known to provide false alarms (e.g., a visual or audible) or to apply throttle and brake control when the FLS detects an object that is not in the vehicle path (e.g., overhead bridges and overhead signs). One approach to eliminating false alarms or inappropriate brake and throttle control is to use a sensor (e.g., radar or laser) with a sufficiently narrow elevation beam such that the main beam does not illuminate overhead objects at the maximum warning range (e.g., one-hundred meters). For automotive applications, this approach has not proven particularly practical due to packaging constraints, which limit the dimensions of the antenna that can be utilized. Further, reducing the width of the elevation beam, to eliminate overhead objects, generally results in the need for multiple elevation beams or beam scanning to ensure that valid targets are still detected given the expected variations in vehicle orientation and road geometry. In addition, implementing multiple beams or beam scanning adds additional cost to a given FLS.

Another approach that has been utilized to distinguish overhead objects from valid in-path objects is to estimate target height by incorporating elevation measurement capability, such as elevation scanning or monopulse, within the sensor of the FLS. However, implementing such schemes also adds additional cost to a given FLS. Another technique for distinguishing overhead objects from valid in-path objects is to examine the lateral extent of the object. For example, bridges typically extend across a roadway, while the lateral extent of an individual vehicle is typically less than a lane width. However, multiple vehicles stopped at a substantially similar range may extend across multiple lanes and thus appear to the FLS as an invalid in-path object, e.g., a bridge. In addition, many overhead signs (e.g., an 'Exit Only' sign for a given lane) are approximately the width of a single lane of a roadway. These limitations tend to decrease the usefulness of examining the lateral extent of an object to determine whether the object is a valid in-path object.

What is needed is a practical technique that prevents a FLS from providing an alarm and/or implementing throttle and brake control when a detected object is not in a host vehicle path.

SUMMARY OF THE INVENTION

The present invention is directed to a technique for distinguishing an overhead roadway object that is not in a host vehicle path from a substantially motionless roadway object that is in the vehicle path. Initially, a plurality of sensor scan signals are provided into an anticipated path of a host vehicle. Next, a plurality of object return signals, that correspond to reflections of the plurality of sensor scan signals, from at least one detected stationary object are received. Then, an average amplitude slope of the return signals, as a function of the range to the at least one detected stationary object, are determined. A sufficiently positive amplitude slope identifies the detected stationary object as an overhead roadway object that is not in the vehicle path. A sufficiently negative amplitude slope identifies the detected stationary object as a substantially motionless roadway object that is in the vehicle path. In another embodiment, when the average amplitude slope is ambiguous, an average amplitude deviation in the return signal is determined as a function of the range to the detected stationary object. An average amplitude deviation that is above an amplitude deviation threshold indicates that the detected stationary object is an overhead roadway object that is not in the vehicle path. An average amplitude deviation that is below the amplitude deviation threshold indicates that the detected stationary object is a substantially motionless roadway object that is in the vehicle path.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT(S)

Figure 1:
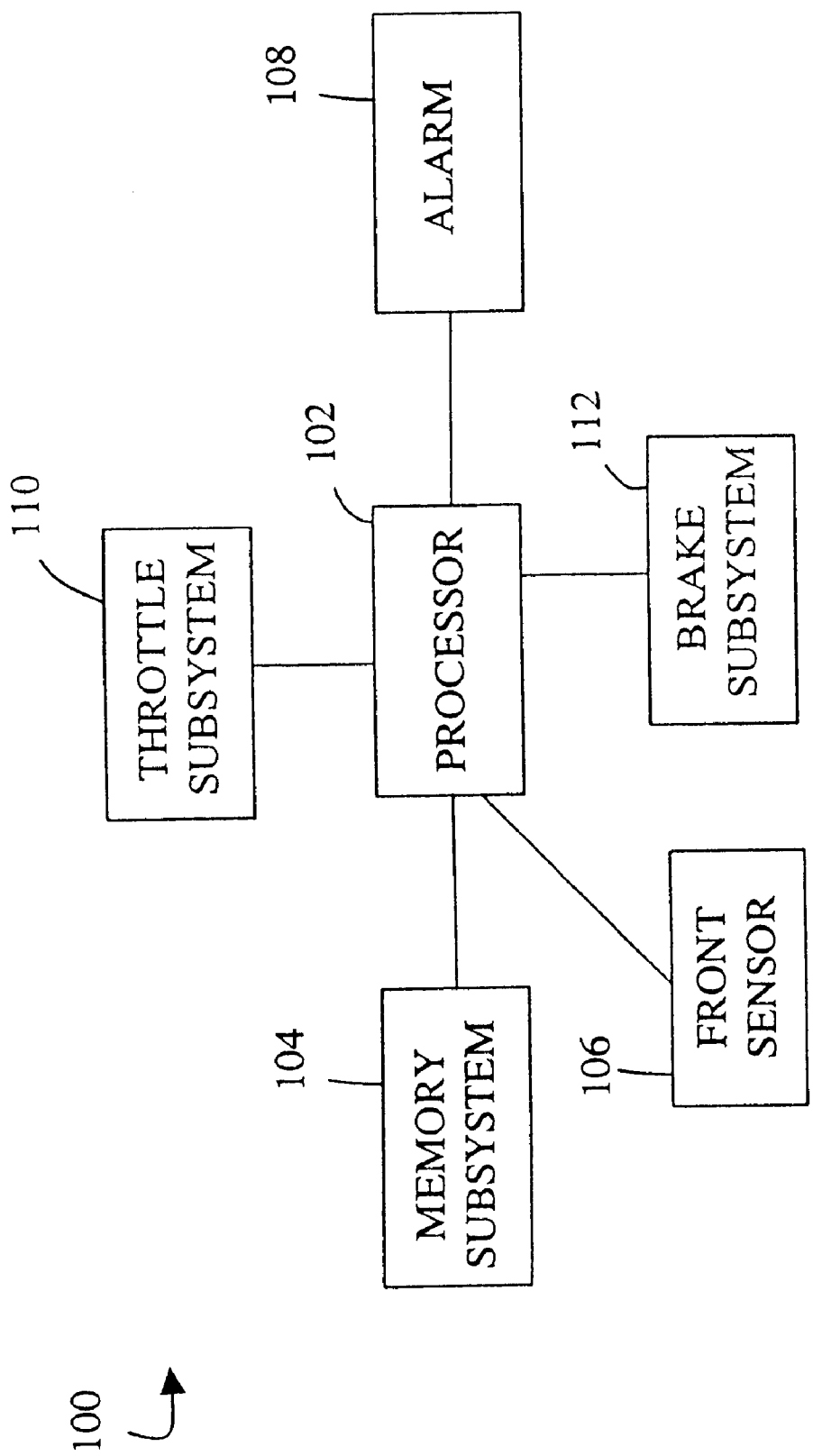
FIG. 1 is an electrical block diagram of an object sensing system, according to an embodiment of the present invention.

Radar return signals from an overhead bridge and/or sign typically exhibit significant amplitude fluctuation with range. This amplitude fluctuation is typically caused by a combination of multipath lobing and the interaction of multiple RF scattering centers. In contrast, the amplitude versus range profile of valid in-path stopped objects shows less fluctuation with range.

The amplitude versus range lobing structure is a function of target or object height and can, for simple cases, be used to estimate height. However, when a radar sensor is located in a host vehicle, that is traveling at a relatively high rate of speed, the multipath lobing pattern may be under-sampled (depending on the radar update rate) making it difficult to extract the information that is needed to accurately estimate target height. Further, bridges and other overhead objects may include many RF scatterers that are distributed in range, cross-range and height. As such, a composite radar return is typically a complex scintillation of the reflections from each scatterer with different amplitude, phase and multipath factors. As the range to an object changes, the multipath factor for each scatterer changes and the relative phase between the scatterers contributes to amplitude scintillation. Thus, the net effect is a pronounced amplitude fluctuation versus range, which is difficult to predict. As a result, target height cannot typically be reliably estimated based on classical multipath lobing techniques.

However, valid in-path stopped objects are lower to the ground than overhead objects and, as such, provide return signals that are distinguishable through examination of their amplitude profile versus range. That is, lower height objects lead to a lobing structure which changes less rapidly with range. Additionally, when directly approaching a valid in-path stopped object, the relative phase between RF scatterers is more stable than overhead objects, which also leads to less amplitude scintillation.

In addition to amplitude fluctuation or deviation in a return signal, another discriminant that can be utilized to distinguish overhead objects from valid in-path objects is the average slope of the amplitude of the return signals versus range. As the sensor equipped vehicle approaches the target, an overhead object gradually moves out of the radar beam, which leads to an average amplitude which decreases as range to the object decreases. In contrast, for a valid in-path object, the radar return will, on the average, increase as range to the object decreases. In summary, the radar return signals from an overhead object, in a roadway environment, are characterized by an average amplitude which generally decreases as the range to the object decreases and by a pronounced amplitude fluctuation about an average amplitude. For a valid in-path stopped object, the amplitude fluctuates less and the average amplitude generally increases as the range to the object decreases. Thus, according to the present invention, the average amplitude slope and the average amplitude deviation or fluctuation can be used to distinguish overhead objects from valid in-path objects.

According to an embodiment of the present invention, the amplitude slope and deviation discriminants are estimated by a linear least squares fit of the amplitude versus range data, for each detected object. The amplitude slope discriminant corresponds to the slope of the linear least squares fit. The amplitude deviation discriminant corresponds to the average fluctuation or deviation of the amplitude data about the linear least squares fit. To facilitate implementation, a recursive least squares approach is used.

For a given object track, the linear least squares fit is initialized after two data points as given below:

$$\hat{X}_2 = \begin{pmatrix} A_2 \\ A_2 - A_1 \end{pmatrix}$$

$$\hat{S}_2 = 0$$

where, the general state vector $$X = \begin{pmatrix} A \\ \Delta A \end{pmatrix};$$

$\hat{S}$=sum of the squared residuals; A=estimated target amplitude; and $\Delta A$=estimated change in target amplitude.

Following initialization, the least squares fit is updated recursively as given below:

$$\overline{X}_n = \Phi \hat{X}_{n-1}$$

$$\hat{X}_n = \overline{X}_n + \begin{pmatrix} \alpha_n \\ \beta_n \end{pmatrix}(A_n - H\overline{X}_n)$$

$$\hat{S}_n = \hat{S}_{n-1} + (1-\alpha_n)(A_n - H\overline{X}_n)^2$$

where, $$\Phi = \begin{pmatrix} 1 & 1 \\ 0 & 1 \end{pmatrix};$$

H=(1 0);

$$\alpha_n = \max\left(\frac{2 \cdot (2n-1)}{n \cdot (n+1)}, \alpha_{\min}\right);$$

$A_n$=measured target amplitude(dB);

$$\beta_n = \max\left(\frac{6}{n \cdot (n+1)}, \beta_{\min}\right);$$

$\alpha_{min}$=minimum $\alpha$; $\beta_{min}$=minimum $\beta$; and n=scan number since an object was first detected.

The state vector parameter $\Delta A$ is related to the slope of the least squares fit. The parameter $\hat{S}$ corresponds to the sum of the squared residuals of the least squares fit (i.e., the sum of the square of the distances from the data points to the least squares fit). As a general rule, $\alpha_{min}$ and $\beta_{min}$ are set to acceptable values, which are determined by examining the data obtained from a number of overhead and stopped objects. In practice, a value of 0.14 for $\alpha_{min}$ and a value of 0.008 for $\beta_{min}$ have generally worked reasonably well for the radar sensor implemented. One of ordinary skill in the art will appreciate that the values for $\alpha_{min}$ and $\beta_{min}$ may require modification, depending on the sensor utilized.

The amplitude discriminants (deviation and slope) are computed from the least squares parameters on each scan as given below:

$$D_n = \sqrt{\frac{\hat{S}_n}{n-2}}$$

-continued $$\dot{A}_n = \frac{\Delta \hat{A}_n}{\Delta R_n}$$

$$R_n = \dot{R} \cdot t$$

where, D=average amplitude deviation; Ȧ=slope of the amplitude versus the range; Ṙ=track range rate; and Δt=update interval.

Preferably, the least squares implementation uses a fading memory approach to allow the estimated amplitude discriminants to better respond to changes in the amplitude characteristics (e.g., respond to the transition in amplitude slope as a bridge leaves the radar beam). The responsiveness of the estimator is controlled by the value of the minimum α and minimum β parameters.

Another feature of the selected implementation is that host vehicle speed is assumed to be fairly constant which is typical of steady state ACC operation. This simplifies the recursive least squares implementation in that the α and β coefficients can be computed solely as a function of the update number. For non-steady state conditions (i.e., when the vehicle speed is not sufficiently constant), accuracy can be improved by a more rigorous recursive least squares approach, which requires that a two-by-two matrix be computed and stored for each tracked object on each scan in order to determine the α and β parameters.

Stopped objects are then classified as overhead or valid stopped objects based on their average amplitude slope and amplitude deviation. A significant sufficiently positive amplitude slope classifies a stopped object as an overhead object, e.g., a bridge. A significant sufficiently negative amplitude slope classifies a stopped object as a valid stopped object. The amplitude deviation is preferably used to classify the stopped object if neither slope criteria is met. For example, if $\dot{A}_n \geq$ threshold1, then the tracked object is classified as a bridge. If $\dot{A}_n \leq$ threshold2, then the tracked object is classified as a valid stopped object. However, when the slope criteria is ambiguous the tracked object is classified as a bridge, if $D_n \geq$ threshold3. Otherwise, the tracked object is classified as a valid stopped object.

The stopped object classification is performed every scan and can change back and forth between a bridge and a valid stopped object on a scan-to-scan basis. As more data is processed for a given tracked object, the accuracy of the least squares parameters typically improve and the classification becomes more reliable.

FIG. 1 illustrates a block diagram of an object sensing system 100, according to an embodiment of the present invention. The object sensing system 100 includes a processor 102 coupled to a memory subsystem 104, a front sensor 106, an alarm 108, a throttle subsystem 110 and a brake subsystem 112. Memory subsystem 104 generally includes an application appropriate amount of volatile memory (e.g., dynamic random access memory (DRAM)) and non-volatile memory (e.g., flash memory, electrically erasable programmable read only memory (EEPROM)). In a preferred embodiment, processor executable code, for determining an average amplitude slope and an average amplitude deviation in a plurality of return signals, is stored within the non-volatile memory of memory subsystem 104 of the object sensing system 100. Processor 102 provides control signals to and receives data from front sensor 106. In response to the data from front sensor 106, processor 102 may provide control signals to throttle subsystem 110 and brake subsystem 112, when implemented as an adaptive cruise control (ACC) system. Alternatively, or in addition, processor 102 may provide control signals to alarm 108 that cause it to provide visual and/or audible feedback to a driver of a vehicle.

In one embodiment, front sensor 106, of sensing system 100, includes a radar sensor that is mounted at the front of the vehicle. In a preferred embodiment, the maximum range of the radar sensor is about one-hundred fifty meters. Preferably, the radar sensor implements a frequency modulated continuous wave (FMCW) of about seventy-six GHz. A suitable radar sensor is manufactured and made commercially available by Delphi Delco Electronics of Kokomo, Ind. (Part No. 09369080). When a linear frequency modulation technique is implemented, the range to a detected object is normally ascertained by determining the frequency differential between the sending of a sensor scan signal and receipt of a return signal. When the sensor scan signal is pulsed, the processor 102 normally examines the output of the sensor 106 in a plurality of windows, with each window corresponding to a particular time delay (i.e., range). Each window includes either a digital '0' or a digital '1', depending upon whether a reflection was received by the sensor 106 during a time period that corresponds to a particular window. In this manner, processor 102 determines the distance to a sensed object.

In the preferred embodiment, object sensing system 100 provides both qualitative audible and visual warnings to a driver of the vehicle. Alarm 108 can represent a visual indicator, an audible indicator, or both. For example, a plurality of light emitting diodes (LEDs) can be included within alarm 108. An exemplary visual indicator includes LEDs that indicate the distance to an object—when all of the LEDs are lit, the object is at the closest point to the front of the vehicle.

Figure 2:
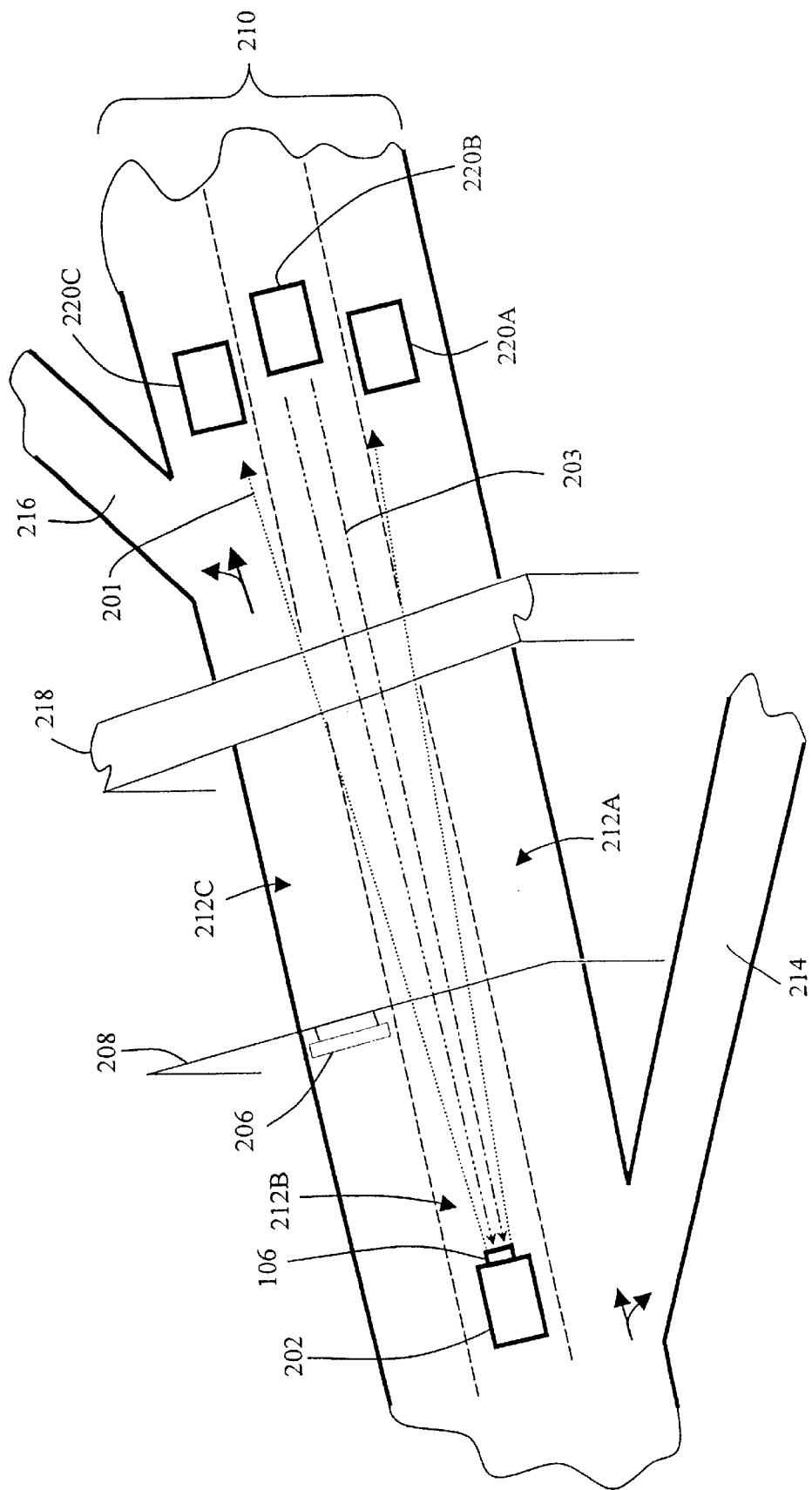
FIG. 2 is a diagram illustrating various objects at the front of a host vehicle, which are detected and distinguished by the object sensing system of FIG. 1.

Turning to FIG. 2, a diagram illustrating various objects at the front of a host vehicle 202, which are detected and distinguished by the object sensing system 100 of FIG. 1, is shown. The vehicle 202 includes a front sensor 106 located at the front of the vehicle 202. A sign 206 is supported by a structure 208 over a roadway 210. The roadway 210, as shown, includes three lanes 212A, 212B and 212C, an exit ramp 214 (located prior to a bridge 218) and an exit ramp 216 (located after the bridge 218). A plurality of vehicles 220A, 220B and 220C are shown located in the lanes 212A, 212B and 212C, respectively. Front sensor 106 provides a plurality of sensor scan signals 201 into an anticipated path of vehicle 202 and receives a plurality of object return signals 203 from one or more objects. Based upon the return signals 203, sensor 106 provides an output to processor 102 (see FIG. 1) for processing. The object return signals 203 may be caused by support structure 208, overhead sign 206, bridge 218 or one or more of the plurality of vehicles 220A, 220B and 220C, among others.

The object sensing system 100, according to an embodiment of the present invention, determines an average amplitude slope of the plurality of return signals as a function of the range to at least one detected stationary object. A sufficiently positive amplitude slope identifies the at least one detected stationary object as an overhead roadway object (e.g., the overhead sign 206, support structure 208 and/or bridge 218), which is not in the path of vehicle 202. A sufficiently negative amplitude slope identifies the at least one detected stationary object as a substantially motionless roadway object that is in the vehicle path, e.g., vehicle 220A, 220B and/or 220C. When the average amplitude slope of the plurality of return signals is ambiguous, the average amplitude deviation in the plurality of return signals (as a function of the range to the at least one detected stationary object) is also analyzed. An average amplitude deviation that is above an established threshold indicates that the at least one detected stationary object is an overhead roadway object, e.g., a bridge and/or a sign, that is not in the vehicle path. An average amplitude deviation that is below the established threshold indicates that the at least one detected stationary object is a substantially motionless roadway object, e.g., a stopped vehicle, that is in the vehicle path. Preferably, the plurality of sensor scan signals are radar signals. However, it is contemplated that other types of sensors, which have return signals with characteristics similar to a radar sensor, can benefit from the invention as claimed herein.

Figure 3A:
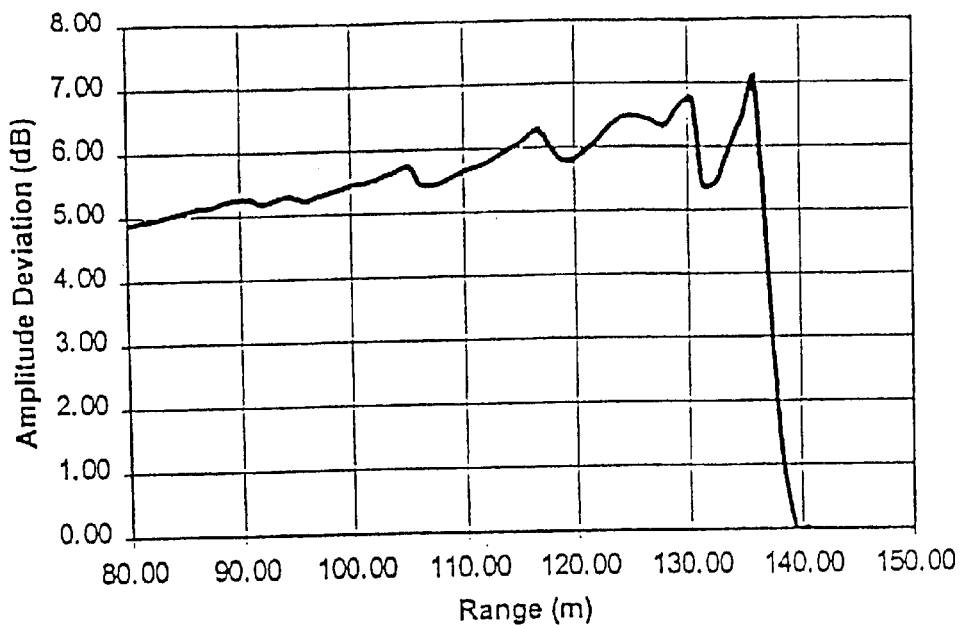
FIG. 3A is a graph that shows the amplitude deviation of a plurality of return signals, as a function of the range to an overhead roadway object.
Figure 3B:
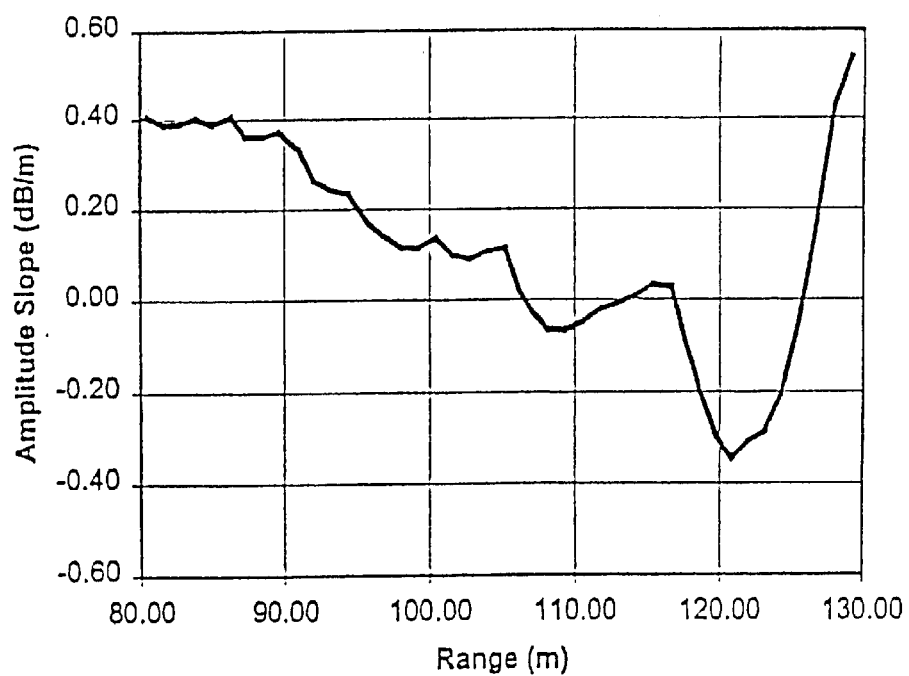
FIG. 3B is a graph that depicts the amplitude slope of a plurality of return signals, as a function of the range to an overhead roadway object.

FIG. 3A depicts the amplitude deviation of a plurality of return signals from an exemplary overhead roadway object, for example, a bridge, plotted as a function of the range to the object. As shown in FIG. 3A, the amplitude deviation remains above 4 dB (i.e., an exemplary deviation threshold) as the vehicle approaches the object. FIG. 3B illustrates the amplitude slope of a return signal as a function of the range to an exemplary overhead roadway object. As shown in FIG. 3B, the amplitude slope exceeds +0.1 (an exemplary sufficiently positive slope threshold) for a range less than or equal to 105 meters (i.e., the amplitude of the return signal generally decreases as the vehicle approaches the object).

Figure 4A:
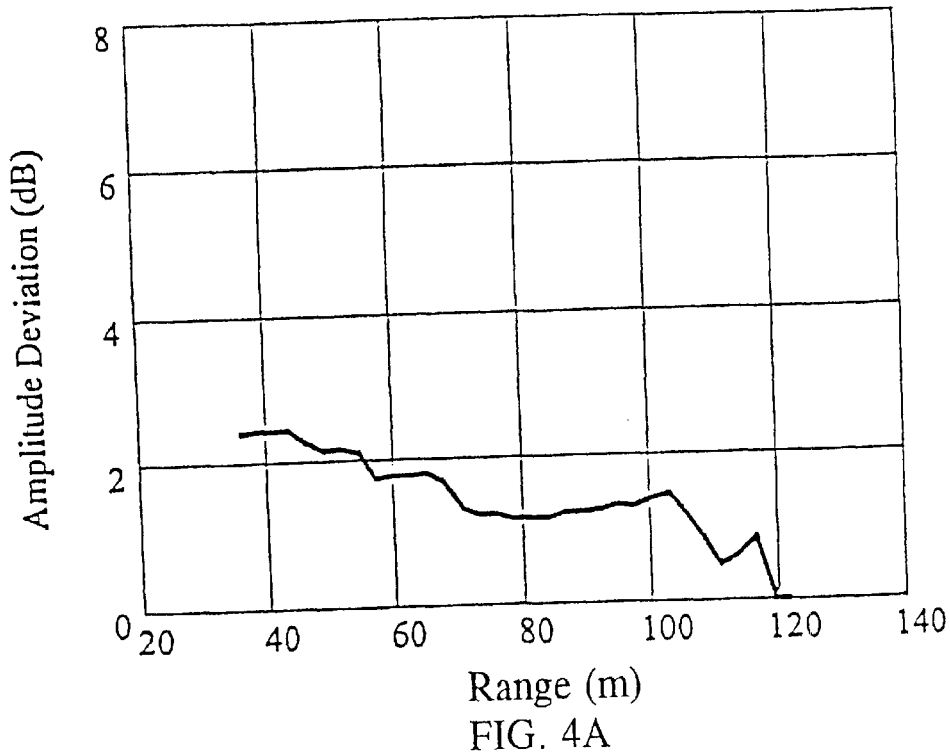
FIG. 4A is a graph that shows the amplitude deviation of a plurality of return signals, as a function of the range to a roadway object.
Figure 4B:
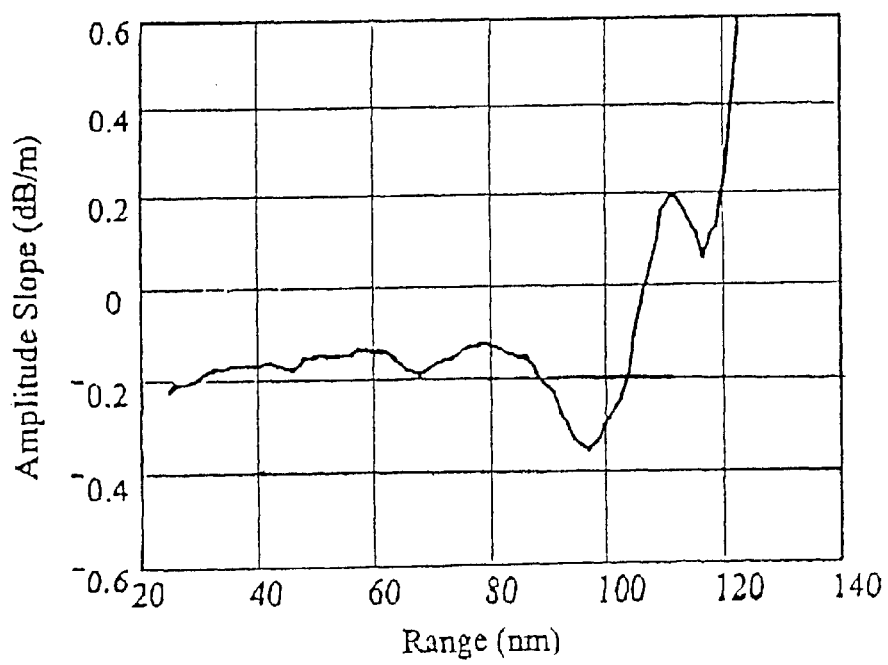
FIG. 4B is a graph that depicts that amplitude slope of a plurality of return signals, as a function of the range to a roadway object.

FIG. 4A shows the amplitude deviation of a plurality of return signals from an exemplary roadway object, e.g., a stopped vehicle, plotted as a function of the range to the object. As shown in FIG. 4A, the amplitude deviation remains below 4 dB (i.e., the exemplary deviation threshold) as the vehicle approaches the roadway object. FIG. 4B illustrates the amplitude slope of a plurality of return signals from an exemplary substantially motionless roadway object plotted as a function of the range to the object. As shown in FIG. 4B, the amplitude slope remains below −0.1 (an exemplary sufficiently negative slope threshold) for a range less than or equal to 105 meters (i.e., the amplitude of the return signal generally increases as the vehicle approaches the object). Thus, by examining the amplitude slope and amplitude deviation, as the vehicle approaches the roadway stationary object, system 100 can determine whether the roadway object is an overhead roadway object or a substantially motionless roadway object that is in the vehicle path.

In summary, a technique has been described wherein a plurality of sensor scan signals are provided into an anticipated path of a vehicle. A plurality of object return signals, that correspond to reflections of the plurality of sensor scan signals, are then received. Next, an average amplitude slope and amplitude deviation of the plurality of return signals, as a function of the range to the at least one detected stationary object, is determined. This enables the object sensing system to determine whether the at least one detected stationary object is an overhead roadway stationary object or a substantially motionless roadway object that is in the vehicle path.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for distinguishing an overhead roadway object that is not in a host vehicle path from a substantially motionless roadway object that is in the vehicle path, comprising the steps of:
   providing a plurality of sensor scan signals into an anticipated path of a host vehicle;
   receiving a plurality of object return signals that correspond to reflections of the plurality of sensor scan signals from at least one detected stationary object; and
   determining an average amplitude slope of the plurality of object return signals as a function of the range to the at least one detected stationary object, wherein a sufficiently positive amplitude slope identifies the at least one detected stationary object as an overhead roadway object that is not in the vehicle path and a sufficiently negative amplitude slope identifies the at least one detected stationary object as a substantially motionless roadway object that is in the vehicle path.

2. The method of claim 1, further including the step of:
   determining an average amplitude deviation in the plurality of object return signals as a function of the range to the at least one detected stationary object, wherein an overhead roadway object that is not in the vehicle path is indicated when the average amplitude deviation is above an amplitude deviation threshold and a substantially motionless roadway object that is in the vehicle path is indicated when the average amplitude deviation is below the amplitude deviation threshold.

3. The method of claim 1, wherein the overhead roadway object is a bridge.

4. The method of claim 1, wherein the overhead roadway object is a sign.

5. The method of claim 1, wherein the motionless roadway object is a stopped vehicle.

6. The method of claim 1, wherein the plurality of sensor scan signals are radar signals.

7. An object sensing system that distinguishes overhead roadway objects that are not in a host vehicle path from substantially motionless roadway objects that are in the vehicle path, comprising:
   a processor;
   a memory subsystem coupled to the processor, the memory subsystem storing information;
   a sensor coupled to the processor; and
   processor executable code for causing the processor to perform the steps of:
      directing the sensor to provide a plurality of sensor scan signals into an anticipated path of a host vehicle;
      receiving a plurality of object return signals from the sensor, the plurality of object return signals corresponding to reflections of the plurality of sensor scan signals from at least one detected stationary object; and
      determining an average amplitude slope of the plurality of object return signals as a function of the range to the at least one detected stationary object, wherein a sufficiently positive amplitude slope identifies the at least one detected stationary object as an overhead roadway object that is not in the vehicle path and a sufficiently negative amplitude slope identifies the at least one detected stationary object as a substantially motionless roadway object that is in the vehicle path.

8. The system of claim 7, wherein the processor executable code causes the processor to perform the additional the step of:
   determining an average amplitude deviation in the plurality of object return signals as a function of the range to the at least one detected stationary object, wherein an overhead roadway object that is not in the vehicle path is indicated when the average amplitude deviation is above an amplitude deviation threshold and a substantially motionless roadway object that is in the vehicle path is indicated when the average amplitude deviation is below the amplitude deviation threshold.

9. The system of claim 7, wherein the overhead roadway object is a bridge.

10. The system of claim 7, wherein the overhead roadway object is a sign.

11. The system of claim 7, wherein the motionless roadway object is a stopped vehicle.

12. The system of claim 7, wherein the plurality of sensor scan signals are radar signals.

13. An automotive object sensing system that distinguishes overhead roadway objects that are not in a host vehicle path from substantially motionless roadway objects that are in the vehicle path, comprising:

a processor;

a memory subsystem coupled to the processor, the memory subsystem storing information;

a front sensor coupled to the processor and located on a front of a host vehicle; and processor executable code for causing the processor to perform the steps of:

directing the front sensor to provide a plurality of sensor scan signals into an anticipated path of the vehicle;

receiving a plurality of object return signals from the front sensor, the plurality of object return signals corresponding to reflections of the plurality of sensor scan signals from at least one detected stationary object; and determining an average amplitude slope of the plurality of object return signals as a function of the range to the at least one detected stationary object, wherein a sufficiently positive amplitude slope identifies the at least one detected stationary object as an overhead roadway object that is not in the vehicle path and a sufficiently negative amplitude slope identifies the at least one detected stationary object as a substantially motionless roadway object that is in the vehicle path.

14. The system of claim 13, wherein the processor executable code causes the processor to perform the additional the step of:

determining an average amplitude deviation in the plurality of object return signals as a function of the range to the at least one detected stationary object, wherein an overhead roadway object that is not in the vehicle path is indicated when the average amplitude deviation is above an amplitude deviation threshold and a substantially motionless roadway object that is in the vehicle path is indicated when the average amplitude deviation is below the amplitude deviation threshold.

15. The system of claim 13, wherein the overhead roadway object is a bridge.

16. The system of claim 13, wherein the overhead roadway object is a sign.

17. The system of claim 13, wherein the motionless roadway object is a stopped vehicle.

18. The system of claim 13, wherein the plurality of sensor scan signals are radar signals.

19. A method for distinguishing an overhead roadway object that is not in a host vehicle path from a substantially motionless roadway object that is in the vehicle path, comprising the steps of:

providing a plurality of sensor scan signals into an anticipated path of a host vehicle;

receiving a plurality of object return signals that correspond to reflections of the plurality of sensor scan signals from at least one detected stationary object; and determining an average amplitude deviation in the plurality of object return signals as a function of the range to the at least one detected stationary object, wherein an overhead roadway object that is not in the vehicle path is indicated when the average amplitude deviation is above an amplitude deviation threshold and a substantially motionless roadway object that is in the vehicle path is indicated when the average amplitude deviation is below the amplitude deviation threshold.

20. The method of claim 19, further including the step of:

determining an average amplitude slope of the plurality of object return signals as a function of the range to the at least one detected stationary object, wherein a sufficiently positive amplitude slope identifies the at least one detected stationary object as an overhead roadway object that is not in the vehicle path and a sufficiently negative amplitude slope identifies the at least one detected stationary object as a substantially motionless roadway object that is in the vehicle path.

21. The method of claim 19, wherein the overhead roadway object is a bridge.

22. The method of claim 19, wherein the overhead roadway object is a sign.

23. The method of claim 19, wherein the motionless roadway object is a stopped vehicle.

24. The method of claim 19, wherein the plurality of sensor scan signals are radar signals.

* * * * *